(12) United States Patent
Garde

(10) Patent No.: US 10,672,282 B2
(45) Date of Patent: Jun. 2, 2020

(54) PARTICLE SENSOR SYSTEM AND METHOD TO DETERMINE VISIBILITY FOR A VEHICLE

(71) Applicant: Honeywell International Inc., Morris Plains, NJ (US)

(72) Inventor: Jason Garde, Anthem, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 82 days.

(21) Appl. No.: 16/112,519

(22) Filed: Aug. 24, 2018

(65) Prior Publication Data

US 2020/0066170 A1 Feb. 27, 2020

(51) Int. Cl.
| G08G 5/00 | (2006.01) |
| B64D 43/00 | (2006.01) |
| G01N 15/02 | (2006.01) |
| G01W 1/00 | (2006.01) |

(52) U.S. Cl.
CPC ........... *G08G 5/0091* (2013.01); *B64D 43/00* (2013.01); *G01N 15/0211* (2013.01); *G01W 1/00* (2013.01);
(Continued)

(58) Field of Classification Search
CPC .. G08G 5/0091; G08G 5/0008; G08G 5/0013; B64D 43/00; G01N 15/0211; G01W 1/00
(Continued)

(56) References Cited

U.S. PATENT DOCUMENTS 7,557,734 B2 7/2009 Estrada et al.
2008/0165031 A1* 7/2008 Estrada ................ G01C 23/005
340/963
2017/0214904 A1 7/2017 Wyatt et al.
2018/0081364 A1 3/2018 Northcutt et al.

FOREIGN PATENT DOCUMENTS

| CN | 102183442 A | 9/2011 |
| CN | 102183442 | * 1/2013 |

(Continued)

OTHER PUBLICATIONS

Bennett, Alec, "Introduction to atmospheric visibility estimation", Bristol Industrial & Research Associates Ltd., 2016, pp. 1-4.
(Continued)

*Primary Examiner* — Joseph H Feild
*Assistant Examiner* — Sharmin Akhter
(74) *Attorney, Agent, or Firm* — Fogg & Powers LLC

(57) ABSTRACT

A system for determining visibility comprises a particle sensor unit mounted onboard a vehicle, and a processor unit in communication with the particle sensor unit. The particle sensor unit comprises a light source configured to transmit a light beam into an external air region; a set of receive optics configured to collect a scattered portion of the light beam from particles in the air region; and an optical detector configured to receive the collected scattered portion and measure a signal intensity. The processor unit is operative to perform a method for determining visibility that comprises analyzing data received from the particle sensor unit to determine particle distribution in a volume of the air region; performing particle differentiation to determine sizes and types of particles in the distribution; calculating visibility data based on the sizes and types of the particles; and outputting the visibility data to one or more onboard systems.

20 Claims, 5 Drawing Sheets

(52) U.S. Cl.
CPC ......... *G08G 5/0008* (2013.01); *G08G 5/0013* (2013.01)

(58) Field of Classification Search
USPC .................................. 340/963–980; 701/3–14
See application file for complete search history.

(56) References Cited

FOREIGN PATENT DOCUMENTS

| | | |
|---|---|---|
| CN | 102183442 B | 1/2013 |
| CN | 102539383 B | 7/2013 |
| EP | 3199918 A1 | 8/2017 |
| JP | 2003044977 A | 2/2003 |

OTHER PUBLICATIONS

Grabner, Martin et al., "The wavelength dependent model of extinction in fog and haze for free space opical commuation", 2011, pp. 1-8, Optical Society of America.

Yang, Ping et al., "Scattering and absorption property database for nonspherical ice particles in the near-trough-far-infrared spectral region", Optical Society of America, 2015, pp. 1-12.

European Patent Office, "Extended European Search Report from EP Application No. 19192692.2", from Foreign Counterpart to U.S. Appl. No. 16/112,519, dated Jan. 3, 2020, pp. 1-9, Published: EP.

* cited by examiner

PARTICLE SENSOR SYSTEM AND METHOD TO DETERMINE VISIBILITY FOR A VEHICLE

BACKGROUND

The atmospheric visibility that is available to operators of various types of vehicles during travel is an important safety concern. Numerous accidents can be attributed to travel of vehicle during low visibility. At night, it can be especially difficult to determine the visibility conditions. Low visibility raises risks leading to spatial disorientation, threat of hitting obstacles, and mid-air collisions.

For aircraft, Federal Aviation Administration (FAA) flight rules require flight visibility minimums for certain types of flying, for example Visual Flight Rules (VFR), Instrument Flight Rules (IFR), and instrument approaches. Determining in flight visibility is a requirement of pilots, both under VFR and IFR. Maintaining minimum visibility is a critical concept in FAA regulations for VFR to help avoid colliding with other aircraft, as well as for avoiding mountains, towers, or any other object. Another major factor in low visibility is spatial disorientation of pilots, which can occur in hazy, low visibility situations that obscure the horizon.

Currently, flight visibility is determined by pilot estimates based on visual reference to ground objects assumed to be a known distance from the moving aircraft. This approach can be very inaccurate based on conditions and is not always possible (e.g., during night flight). There are no sensors or equipment that can detect and report in-flight visibility in all phases of flight. Airports have equipment on the ground that can provide ground visibility reporting, but those values are limited to the location of the equipment and do not satisfy the requirements for the pilot in determining the flight visibility. Unfortunately, depending on the conditions, the visibility estimates by pilots can lead to both legal and safety concerns.

For example, Federal Aviation Regulation 91.175 requires that no pilot may operate an aircraft below the authorized minimum descent altitude or continue an approach below the authorized descent altitude/height unless the flight visibility is not less than the visibility prescribed in the standard instrument approach being used. In the past, this has caused FAA legal action against pilots when the reported airport ground visibility is lower than the visibility for the approach, and the pilot has to argue the case that the flight visibility was at or above the minimum without any verifiable evidence.

SUMMARY

A system for determining visibility comprises a particle sensor unit mounted onboard a vehicle, and a processor unit in operative communication with the particle sensor unit. The particle sensor unit comprises at least one light source configured to transmit a light beam into an external interrogation air region; a set of receive optics configured to provide at least one receive channel, the receive optics configured to collect a scattered portion of the transmitted light beam from at least one particle in the interrogation air region; and an optical detector in communication with the at least one receive channel and configured to receive the collected scattered portion of the transmitted light beam, the optical detector operative to measure a signal intensity from the scattered portion, the signal intensity indicating a particle size of the at least one particle. The processor unit is operative to execute instructions stored on a processor readable medium to perform a method for determining visibility. The method comprises analyzing data received from the particle sensor unit to determine particle distribution in a volume of the air region; performing particle differentiation to determine sizes and types of particles in the particle distribution; calculating visibility data based on the sizes and types of the particles; and outputting the visibility data to one or more onboard systems in the vehicle.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
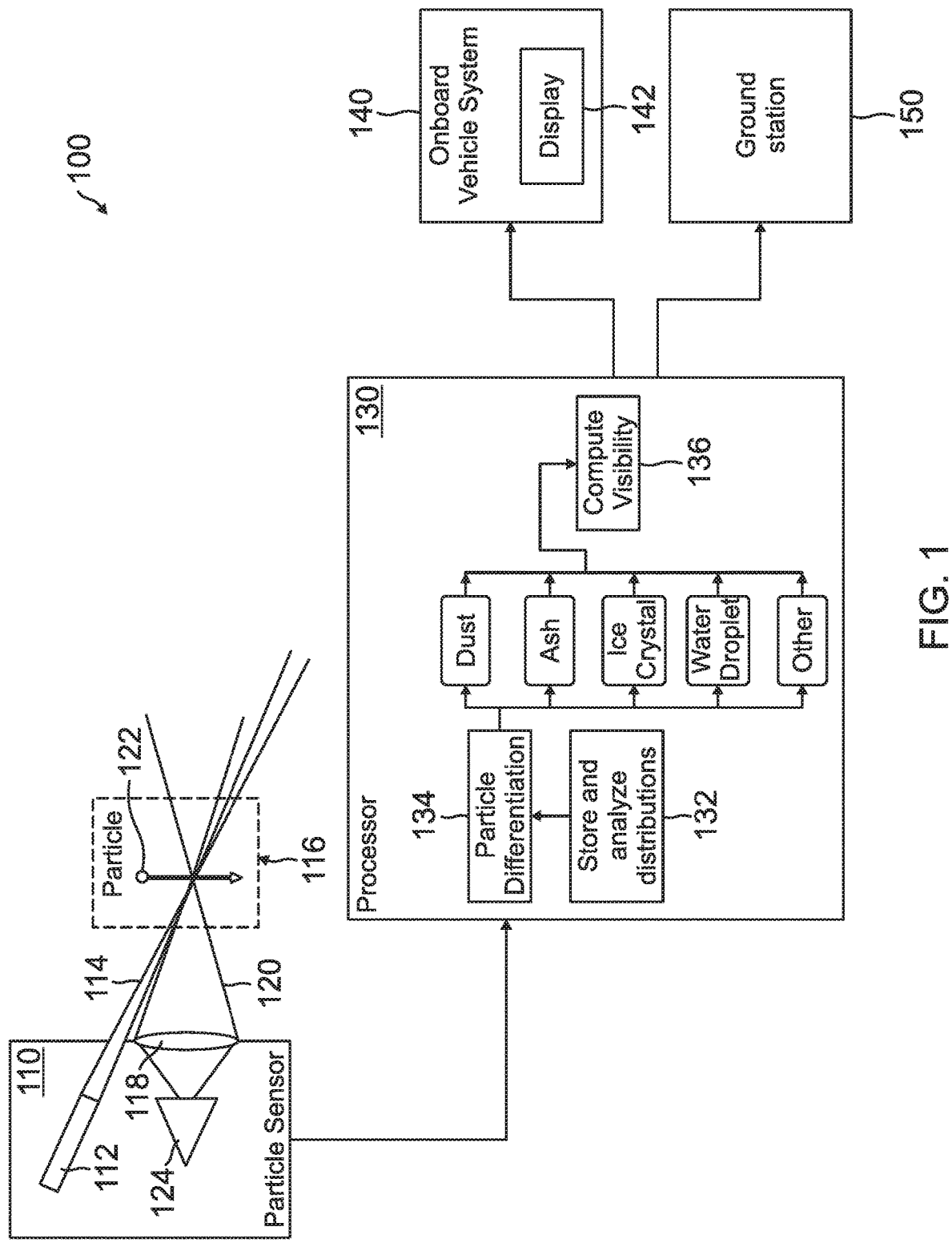
FIG. 1 is a block diagram of system for determining visibility for a vehicle, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method of determining visibility for a vehicle are disclosed herein. The system and method employ a particle sensor coupled with a processor to estimate visibility for the vehicle. The particle sensor is used to sample a volume of air and determine how many of what type and diameter/size particles are in the volume of air. These particles will have an extinction coefficient based on how much visible light they absorb or reflect, thus reducing visibility from otherwise particle-free air. Using that information about extinction coefficients, the visibility can be calculated by the processor.

In one implementation of the present system for aircraft, a particle detector sensor onboard the aircraft is used in conjunction with a processor to estimate flight visibility for all phases of flight, including the approach phase, before any ground references are visible for use by a pilot. This will provide aid in improving flight safety and regulatory compliance by giving the pilot a way to quantitatively determine flight visibility.

The system employs the particle detector sensor, such as an optical particle sensor, to estimate in flight visibility based on the type and density of particles detected in a known volume of air outside of the aircraft. The system determines the amount, size, and type of particles flowing through this volume of air, and then estimates the visibility of the air based on computations, a look up table, or a combination thereof, via the processor.

For example, the processor can be configured to analyze the particle distribution and type, calculate extinction coefficients of the particles, and estimate the visibility. In another approach, the processor can check the measured particle data with a data table to "look up" the flight visibility based on known or previously determined values. For example, standards or tables already used by ground systems to determine visibility can be adopted for use by a flight instrument to check the measured particle data. The processor or look up table estimates can also be calibrated or optimized to specific aircraft installations and aerodynamic characteristics of airflow around the sensor. Once the flight visibility is determined, this visibility information is made available for transmission to one or more aircraft systems, or for transmission to a ground station via connected aircraft technologies to provide this information to other consumers (e.g., other aircraft on the same instrument approach to the airport).

In various implementations, the visibility information can be output to one or more consuming systems on the aircraft, including flight crew displays such as a primary display or a multi-function display unit in a cockpit; a flight management system; an onboard data server, for data transmission of the visibility information to ground based services and consumers; air to air datalink for other aircraft consumers; or a flight data recorder. A selective output format for the visibility information can be provided such as statue miles, kilometers, nautical miles, feet, or the like.

In addition, the outputs for the flight visibility information can be selective such that an alert or notification is provided if visibility is below the minimum visibility required for the selected instrument approach procedure. This can either be set by the pilot or read for the navigation database for the instrument approach being used. An alert or notification can also be provided if visibility is below the minimum visibility required for visual flight rules (VFR) operation (e.g., day VFR, night VFR, and special VFR minimums). An alert or notification can be provided if visibility is below, above, or deviates from a preselected range. The visibility information can be provided either on demand, or at selected time intervals as desired (e.g., refresh every 1, 5, or 10 seconds).

The present system can be used independently in all flight phases, or can be employed with other onboard systems such as an enhanced flight vision system (EFVS). An exemplary EFVS is disclosed in U.S. Patent Application Pub. No. 2017/0214904, the disclosure of which is incorporated by reference herein. The EFVS is used to optically identify features on the ground near a runway during an instrument approach, and estimates if flight visibility criteria are met in front of the aircraft. Information is then displayed to the pilot.

In addition, the present system and method can be used in determining visibility for various types of vehicles besides aircraft, including ground vehicles such as trucks and cars, marine craft such as boats and ships, or trains.

The present system is useful in ground vehicles, especially at night, when it is difficult for a driver to tell how much dust and fog limits visibility to a dangerous point. For example, the system can alert a driver when the visibility drops to less than the stopping distance capability of vehicle, to avoid colliding with an object on the road before it can be seen and an emergency stop initiated.

Marine craft can benefit from the present system as well, such as when the marine craft encounter fog or operate at night, and an operator may not know what the visibility is so as to avoid other objects. For example, the system can alert the operator when the visibility drops to less than a certain distance needed to prevent the marine craft from colliding with another object, such as an iceberg or another ship, and would be seen too late to avoid a collision.

When used on trains, the system can alert train engineers so they know of the need to reduce speed to allow for stopping distance once an object is seen on the tracks. For example, the system can alert a train engineer when the visibility drops to less than the stopping distance capability of the train, to avoid colliding with an object on the tracks before it can be seen and an emergency stop initiated.

Further details of various embodiments are described hereafter with reference to the drawings.

FIG. 1 illustrates a system 100 of determining visibility for a vehicle, according to one embodiment. The system 100 generally comprises a particle sensor unit 110 mounted onboard the vehicle, and a processor unit 130 in operative communication with particle sensor unit 110. The processor unit 130 is operative to execute instructions stored on a processor readable medium to perform a method for determining visibility.

The particle sensor unit 110 comprises at least one light source 112, such as a laser transmitter, which is configured to transmit a light beam 114 into an external interrogation air region 116. A set of receive optics 118 in particle sensor unit 110 is configured to provide at least one receive channel. The receive optics 118 are configured to collect a scattered portion 120 of transmitted light beam 114 from at least one particle 122 in interrogation air region 116. In one embodiment, light source 112 and receive optics 118 can be implemented in an optical transceiver.

An optical detector 124 in particle sensor unit 110 is in communication with the receive channel and is configured to receive the collected scattered portion 120. The optical detector 124 is operative to measure a signal intensity as a function of time from scattered portion 120. The signal intensity indicates a size of particle 122.

The processor unit 130 is configured to receive input data from optical detector 124 of particle sensor unit 110. The processor unit 130 is operative to store and analyze the received input data to determine particle distributions in a volume of air outside the vehicle (block 132); and to perform particle differentiation to determine types of particles in the particle distributions (block 134). For example, processor unit 130 can determine various types of particles, such as dust, ash, ice crystals, water droplets, or others. The processor unit 130 then computes visibility data based on the types of particles (block 136).

The visibility data can be output from processor unit 130 to one or more other onboard vehicle systems 140, such as a display unit 142, for use in further vehicle data processing. The visibility data can also be transmitted to a ground station 150 for use in other systems.

Figure 2:
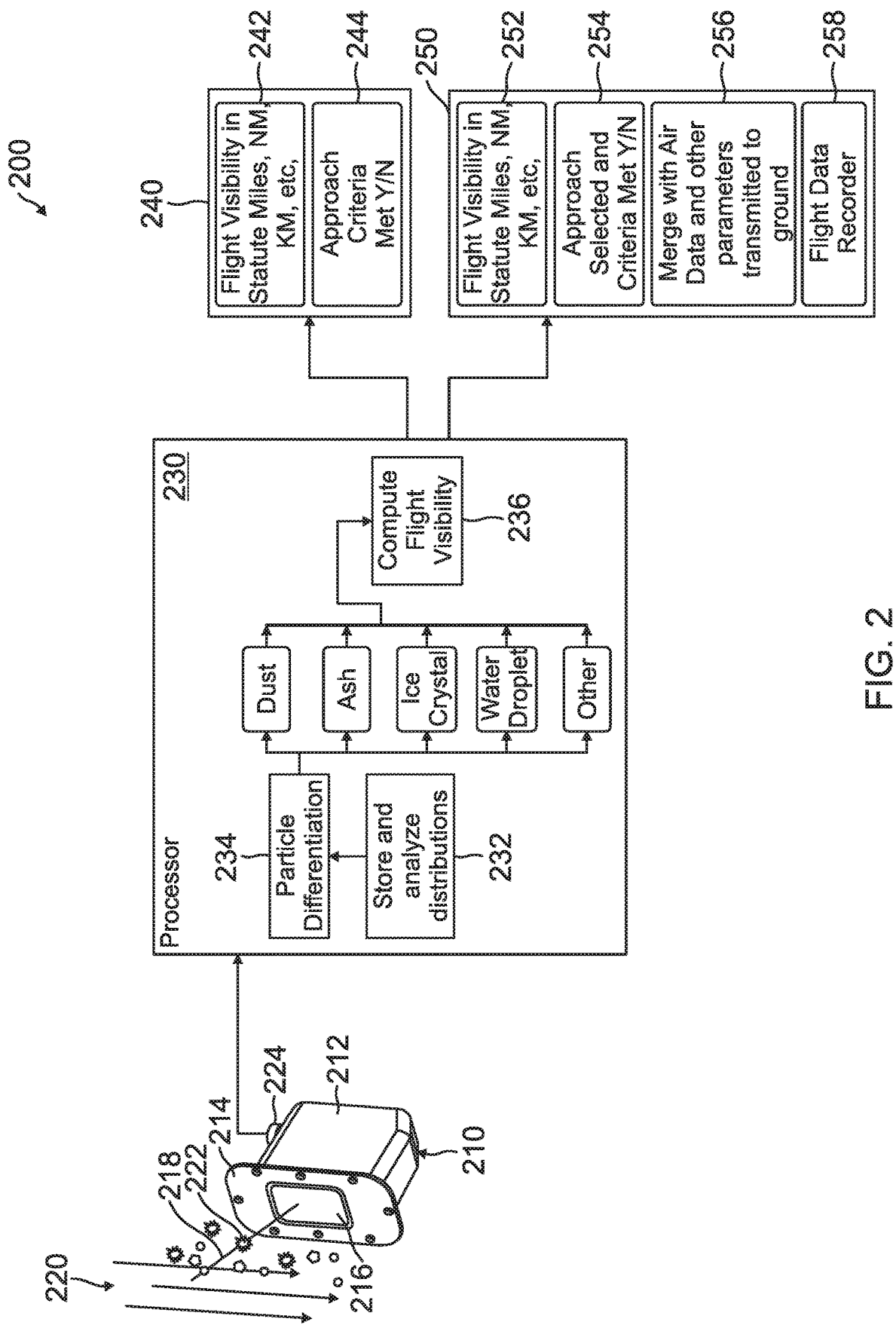
FIG. 2 is a block diagram of a system for determining flight visibility for an aircraft, according to another embodiment.

FIG. 2 illustrates a system 200 of determining in flight visibility for an aircraft, according to another embodiment. The system 200 generally comprises a particle detector sensor such as a laser-based optical particle sensor 210 mounted onboard the aircraft. A processor unit 230 such as a central processing unit (CPU) is in operative communication with optical particle sensor 210. The processor unit 230 is operative to execute instructions to perform a method for determining flight visibility, which is described in further detail hereafter.

The optical particle sensor 210 generally includes a housing 212 that encloses a laser transmitter, and mounting plate 214 with a window 216 that is configured to transmit a light beam 218 from the laser transmitter into an external interrogation air region 220 outside of the aircraft. A set of receive optics in housing 212 is configured to collect a scattered portion of transmitted light beam 218 from a plurality of particles 222 in interrogation air region 220, such as particles of dust, ash, ice crystals, water droplets, or the like. An optical detector in housing 212 is operative to measure a signal intensity as a function of time from the scattered portion to generate particle data. An input/output (I/O) port 224 of optical particle sensor 210 is configured to send the particle data to processor unit 230 for processing and determining the flight visibility.

The processor unit 230 is operative to store and analyze the received particle data to determine particle distributions in a volume of air outside the aircraft (block 232); and to perform particle differentiation to determine types of particles in the particle distributions (block 234). For example, processor unit 230 can determine various types of particles in the air, such as dust, ash, ice crystals, water droplets, or others. The processor unit 230 then computes flight visibility data based on the types of particles (block 236). Further details related to computing of the flight visibility data are described hereafter.

The visibility data can then be output from processor unit 230 to a cockpit display unit 240 for displaying flight visibility information to a pilot. For example, display unit 240 can show flight visibility information in the form of statute miles, nautical miles (NM), kilometers (KM), etc. (block 242). Additionally, display unit 240 can show whether approach criteria with respect to visibility are met in a yes or no (Y/N) indicator (block 244).

The flight visibility data can also be output from processor unit 230 to other onboard aircraft systems 250, for use by such systems or for transmitting the flight visibility data to a ground station. For example, the other onboard aircraft systems 250 can receive the flight visibility in statute miles, NM, KM, etc. (block 252), and can determine with respect to the approach selected whether visibility criteria are met (block 254). The flight visibility data can also be merged with air data and other parameters for transmission to the ground (block 256), such as an airport or a PIREP system (PIREP=Pilot report of inflight conditions). When using the PIREP system, electronic submission is to the ground, rather than via radio to Air Traffic Control or Flight Service Station. The flight visibility data can also be sent to a flight data recorder located in the aircraft (block 258).

Figure 3:
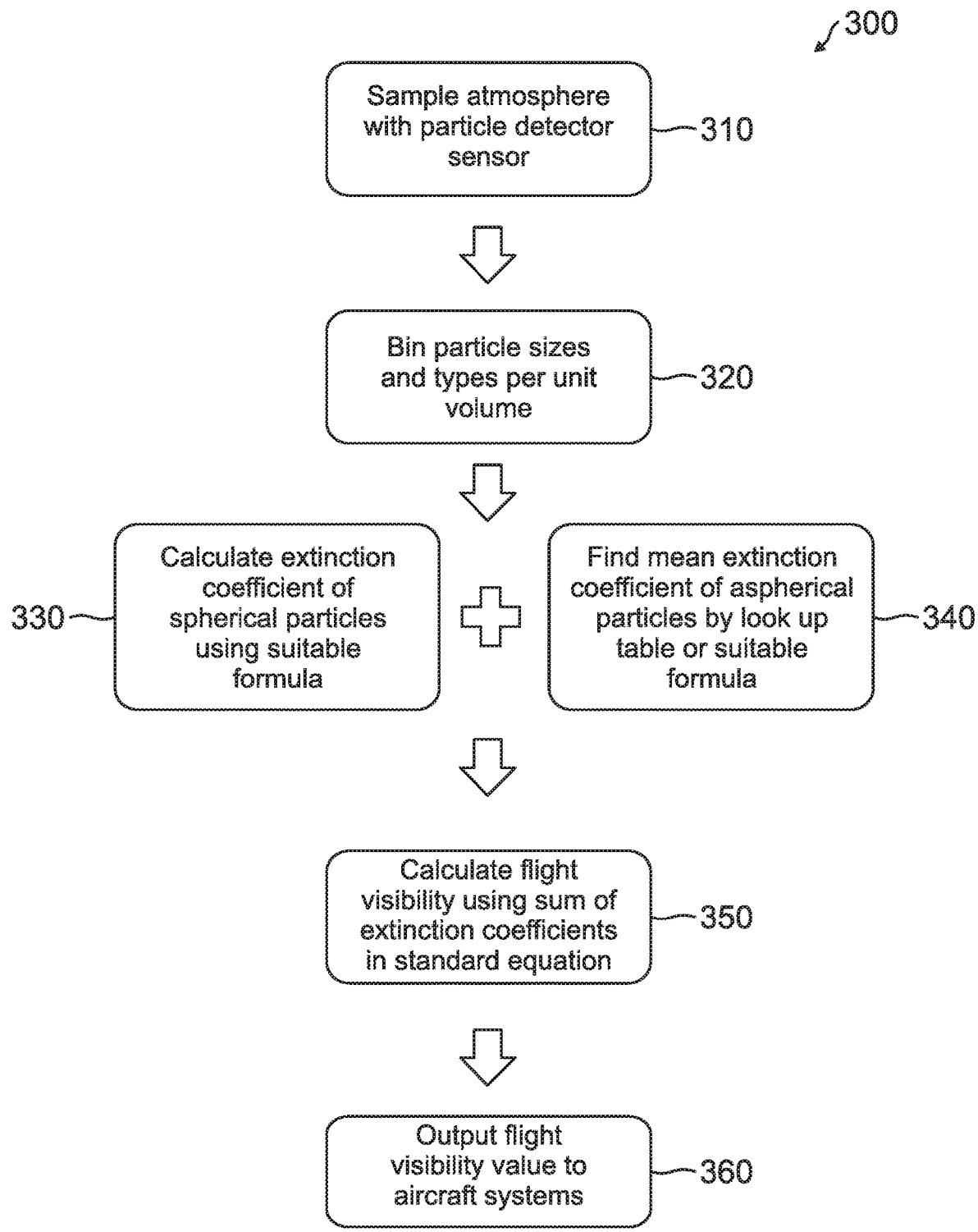
FIG. 3 is a flow diagram of a method for determining flight visibility, which can be performed by the system of FIG. 2.

FIG. 3 is a flow diagram of a method 300 for determining flight visibility, which can be performed by system 200. Initially, method 300 samples the atmosphere outside of an aircraft with a particle detector sensor (block 310), such as with optical particle sensor 210. The particle distributions of the sampled atmosphere are stored and analyzed, such as by processor unit 230. Particle differentiation is then carried out in which method 300 bins particle sizes and types per unit volume of atmosphere (block 320). In order to compute flight visibility data, method 300 calculates an extinction coefficient of spherical particles using a suitable formula (block 330), and finds a mean extinction coefficient of aspherical particles when present by use of a look up table or a suitable formula (block 340). The method 300 then calculates flight visibility using the sum of extinction coefficients in a standard equation (block 350), and outputs a flight visibility value to one or more aircraft systems (block 360).

In an example implementation of method 300, an extinction coefficient ($\sigma$) of spherical particles (e.g., water droplets) can be calculated using the formula:

$$\sigma = \pi n a^2 Q \tag{1}$$

where n is the number of spherical particles per unit volume, a is particle radius, and Q is defined as the efficiency factor determined by the formula:

$$Q = 2 - (4/\rho \sin \rho) + (2/\rho)^2 (1 - \cos \rho) \tag{2}$$

with $\rho$ defined by:

$$\rho = 2x(m-1) \tag{3}$$

with m being the index of refraction (e.g., 1.333 for water droplets), and x defined as $$x = 2\pi a/\lambda \tag{4}$$

where $\lambda$ is the predominant wavelength in the visible region of the spectrum. When aspherical particles (e.g., ice, volcanic ash, dust) are present, standard look up tables can be used for determining effective extinction coefficients (scattering and absorption) of these types of particles. Once the sum of extinction coefficients of spherical particles and any aspherical particles is known, then Koschmieder's equation can be used to calculate flight visibility ($V_f$) as follows:

$$V_f = 3.912/\varepsilon_{ext} \tag{5}$$

where $\varepsilon_{ext}$ is the sum of extinction coefficients of all particles (spherical and aspherical), which attenuate light. In equation (5), the extinction coefficients are averaged over visible wavelengths (often taken at about 550 nm wavelength). In other implementations, the system can be calibrated such that the proper numerator is used in equation (5) as needed to provide the most accurate visibility results.

In an example implementation of the particle detector sensor, a laser-based optical particle sensor can be utilized that directly measures particles by size and counts, and stores and uses this data for a given sample interval. The laser-based optical particle sensor can directly measure particles by size in histogram form. The particle detector sensor can also be implemented by other similar optical particle sensors that have the capability to measure particle size, such that extinction coefficients of the particles can be derived. These optical particle sensors allow the present method to bin the particles by size, quantity, and type (spherical or aspherical) of particle per given sample volume. This provides outputs such as effective diameter and median volume diameters among others values for extinction coefficient calculations.

Figure 4:
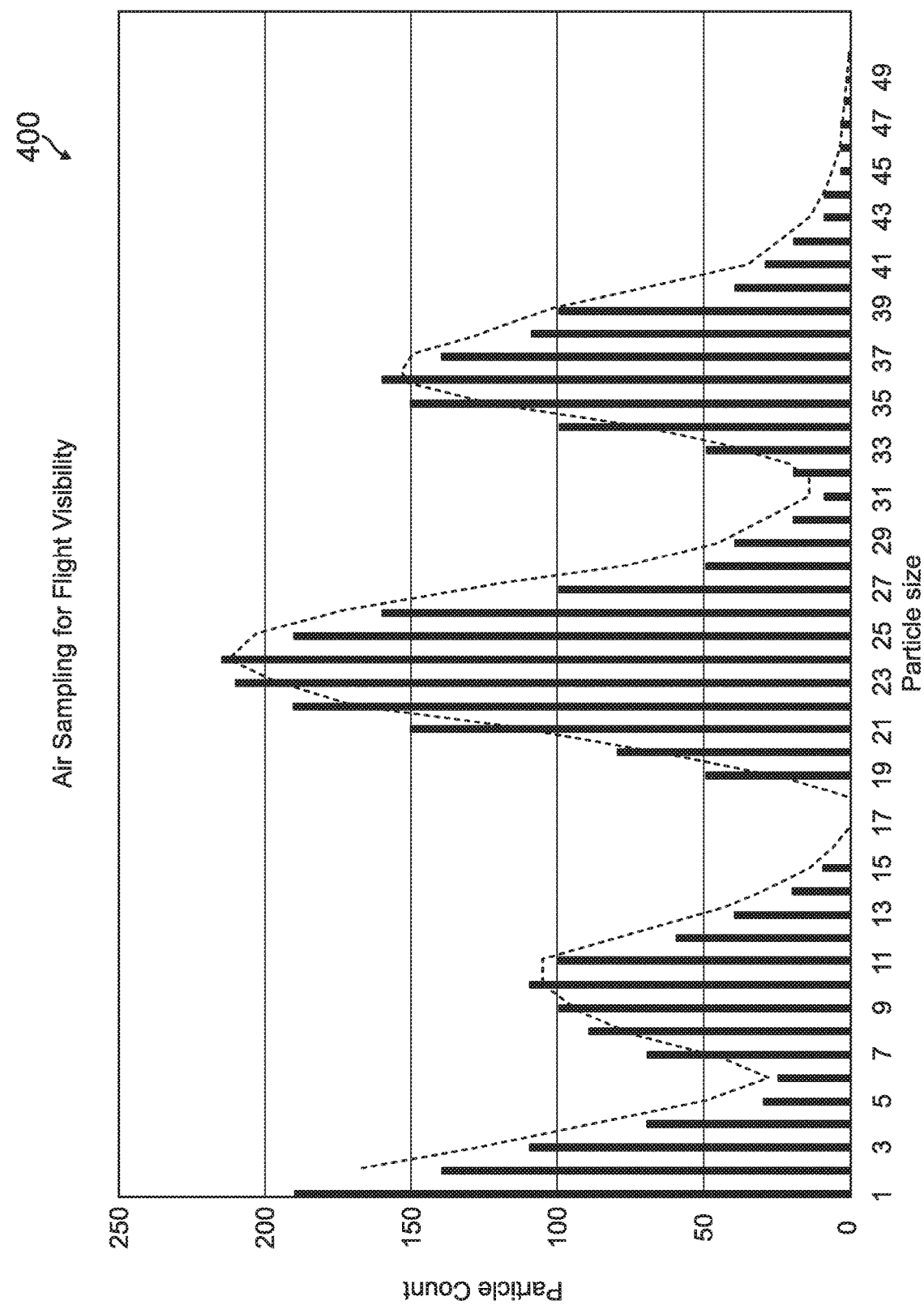
FIG. 4 is a graphical representation of the particle count with respect to particle size for an air sampling using the method of FIG. 3.

FIG. 4 is a graphical representation 400, in the form of a histogram, of an exemplary air sampling for determining flight visibility using the present method. The graphical representation 400 depicts the particle count with respect to particle size for a number of bins, showing a visual representation of the sample volume content and represents the particles that will contribute to the extinction coefficient value. The different particle sizes can mean different types of particles, such as water droplets and some ice particles, for example.

Figure 5:
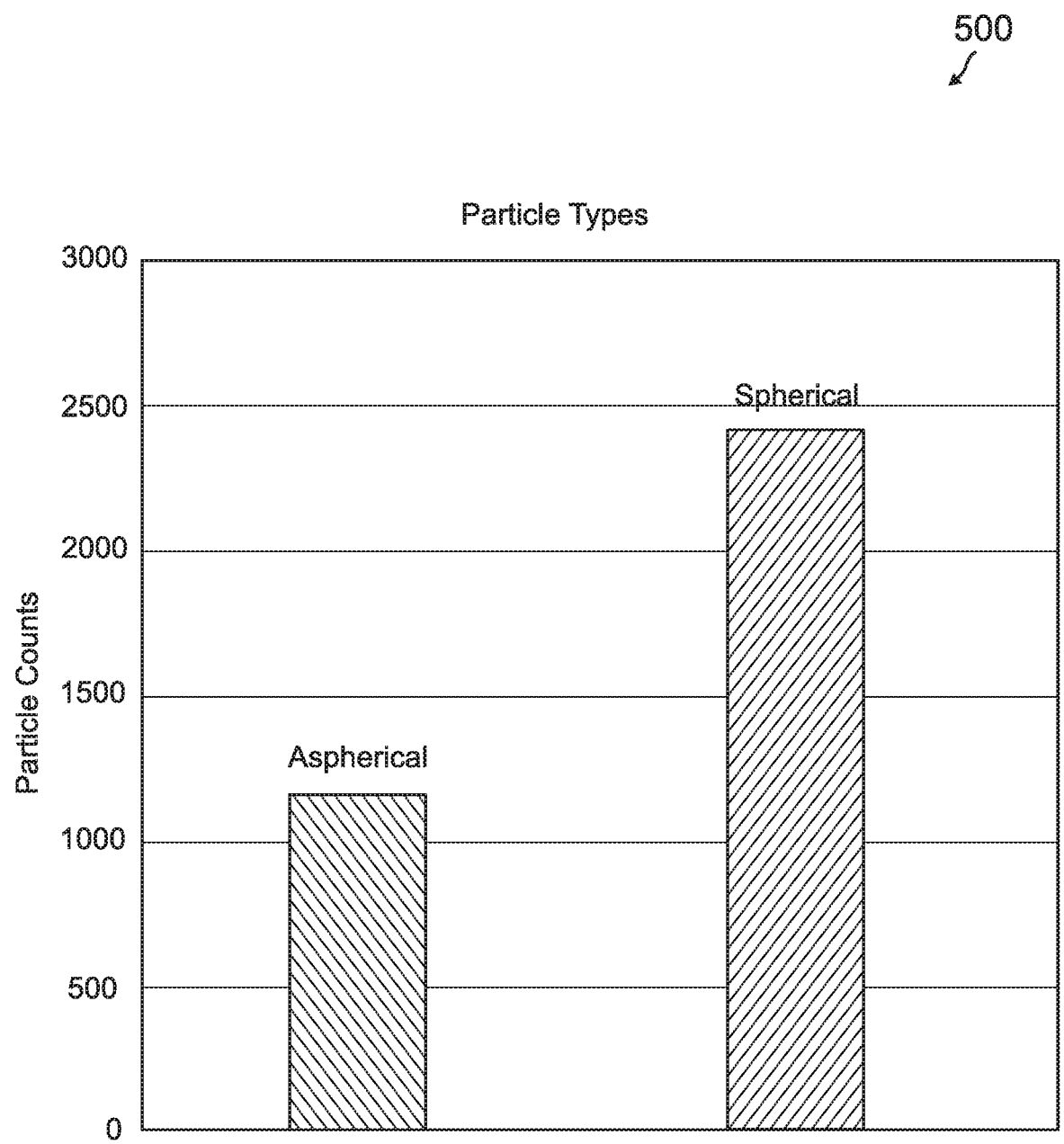
FIG. 5 is a graphical representation of the particle types found in the air sampling using the method of FIG. 3.

FIG. 5 is a graphical representation 500 of the particle types found in an exemplary air sampling using the present method. The graphical representation 500 depicts particle counts for each of the spherical particles and the aspherical particles found in the air sampling. This grouping of particle types supports using different approaches or formulas for calculating extinction coefficients and is a way to increase visibility calculation estimate accuracies.

EXAMPLE EMBODIMENTS

Example 1 includes a system for determining visibility, the system comprising a particle sensor unit mounted onboard a vehicle, the particle sensor unit comprising: at least one light source configured to transmit a light beam into an external interrogation air region; a set of receive optics configured to provide at least one receive channel, the receive optics configured to collect a scattered portion of the transmitted light beam from at least one particle in the interrogation air region; and an optical detector in communication with the at least one receive channel and configured to receive the collected scattered portion of the transmitted light beam, the optical detector operative to measure a signal intensity from the scattered portion, the signal intensity indicating a particle size of the at least one particle. A processor unit is in operative communication with the particle sensor unit, the processor unit operative to execute instructions stored on a processor readable medium to perform a method for determining visibility, the method comprising: analyzing data received from the particle sensor unit to determine particle distribution in a volume of the air region; performing particle differentiation to determine sizes and types of particles in the particle distribution; calculating visibility data based on the sizes and types of the particles; and outputting the visibility data to one or more onboard systems in the vehicle.

Example 2 includes the system of Example 1, wherein the at least one light source comprises a laser transmitter.

Example 3 includes the system of Example 2, wherein the laser transmitter and the receive optics are implemented in an optical transceiver.

Example 4 includes the system of any of Examples 1-3, wherein the particle sensor unit comprises an optical particle sensor.

Example 5 includes the system of any of Examples 1-4, wherein the method for determining visibility further comprises: transmitting the visibility data to a ground station.

Example 6 includes the system of any of Examples 1-5, wherein the particle differentiation is performed by binning particle sizes and particle types, the particle types including spherical particles, or both spherical particles and aspherical particles.

Example 7 includes the system of Example 6, wherein the visibility data is calculated by a process comprising: determining an extinction coefficient for the spherical particles, or extinction coefficients for the spherical particles and the aspherical particles; and calculating a visibility value based on a sum of the extinction coefficients.

Example 8 includes the system of any of Examples 1-7, wherein the vehicle comprises an aircraft, a ground vehicle, or a marine craft.

Example 9 includes a method for determining visibility, the method comprising: sampling atmosphere outside of a vehicle with a particle detector sensor to obtain data on distribution of particles in a unit volume of the atmosphere; performing particle differentiation by binning particle sizes and particle types per the unit volume, the particle types including spherical particles, or both spherical particles and aspherical particles; determining an extinction coefficient for the spherical particles, or extinction coefficients for the spherical particles and the aspherical particles; calculating a visibility value for the vehicle based on a sum of the extinction coefficients; and outputting the visibility value to one or more vehicle systems.

Example 10 includes the method of Example 9, wherein the particle detector sensor comprises an optical particle sensor.

Example 11 includes the method of any of Examples 9-10, wherein the method further comprises: transmitting the visibility value to a ground station.

Example 12 includes the method of any of Examples 9-11, wherein the vehicle comprises an aircraft, a ground vehicle, or a marine craft.

Example 13 includes a system for estimating flight visibility, the system comprising a particle detector sensor mounted on an aircraft; and a processor in operative communication with the particle detector sensor, wherein the processor is operative to execute instructions to perform a method comprising: analyzing data received from the particle detector sensor to determine particle distribution in a unit volume of air outside the aircraft; performing particle differentiation by binning particle sizes and particle types per the unit volume of air, the particle types including spherical particles, or both spherical particles and aspherical particles; determining an extinction coefficient for the spherical particles, or extinction coefficients for the spherical particles and the aspherical particles; calculating a flight visibility value for the aircraft based on a sum of the extinction coefficients; and outputting the flight visibility value to one or more onboard aircraft systems.

Example 14 includes the system of Example 13, wherein the particle detector sensor comprises a laser-based optical particle sensor.

Example 15 includes the system of any of Examples 13-14, wherein the flight visibility value is calculated using an equation based on Koschmieder's equation.

Example 16 includes the system of any of Examples 13-15, wherein the one or more onboard aircraft systems comprise a flight crew display, a flight management system, or a flight data recorder.

Example 17 includes the system of any of Examples 13-15, wherein the one or more onboard aircraft systems comprise an onboard data server for transmission of the flight visibility value to ground based services or consumers; or an air to air datalink for transmission of the flight visibility value to other aircraft consumers.

Example 18 includes the system of any of Examples 13-17, wherein the processor is operative to output the flight visibility value in a selective output format comprising statute miles, kilometers, nautical miles, or feet.

Example 19 includes the system of any of Examples 13-18, wherein the processor is operative to generate an alert or notification when the flight visibility value is below a minimum visibility required for a selected instrument approach procedure; generate an alert or notification when the flight visibility value is below a minimum visibility required for visual flight rules; or generate an alert or notification when the flight visibility value is below, above, or deviates from a preselected range.

Example 20 includes the system of any of Examples 13-19, wherein the processor is operative to output the flight visibility value on demand, or at selected time intervals.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for determining visibility, the system comprising:
 a particle sensor unit mounted onboard a vehicle, the particle sensor unit comprising:
  at least one light source configured to transmit a light beam into an external interrogation air region;

a set of receive optics configured to provide at least one receive channel, the receive optics configured to collect a scattered portion of the transmitted light beam from at least one particle in the interrogation air region; and an optical detector in communication with the at least one receive channel and configured to receive the collected scattered portion of the transmitted light beam, the optical detector operative to measure a signal intensity from the scattered portion, the signal intensity indicating a particle size of the at least one particle; and a processor unit in operative communication with the particle sensor unit, the processor unit operative to execute instructions stored on a processor readable medium to perform a method for determining visibility, the method comprising:

analyzing data received from the particle sensor unit to determine particle distribution in a volume of the air region;

performing particle differentiation to determine sizes and types of particles in the particle distribution;

calculating visibility data based on the sizes and types of the particles; and outputting the visibility data to one or more onboard systems in the vehicle.

2. The system of claim 1, wherein the at least one light source comprises a laser transmitter.

3. The system of claim 2, wherein the laser transmitter and the receive optics are implemented in an optical transceiver.

4. The system of claim 1, wherein the particle sensor unit comprises an optical particle sensor.

5. The system of claim 1, wherein the method for determining visibility further comprises:

transmitting the visibility data to a ground station.

6. The system of claim 1, wherein the particle differentiation is performed by binning particle sizes and particle types, the particle types including spherical particles, or both spherical particles and aspherical particles.

7. The system of claim 6, wherein the visibility data is calculated by a process comprising:

determining an extinction coefficient for the spherical particles, or extinction coefficients for the spherical particles and the aspherical particles; and calculating a visibility value based on a sum of the extinction coefficients.

8. The system of claim 1, wherein the vehicle comprises an aircraft, a ground vehicle, or a marine craft.

9. A method for determining visibility, the method comprising:

sampling atmosphere outside of a vehicle with a particle detector sensor to obtain data on distribution of particles in a unit volume of the atmosphere;

performing particle differentiation by binning particle sizes and particle types per the unit volume, the particle types including spherical particles, or both spherical particles and aspherical particles;

determining an extinction coefficient for the spherical particles, or extinction coefficients for the spherical particles and the aspherical particles;

calculating a visibility value for the vehicle based on a sum of the extinction coefficients; and outputting the visibility value to one or more vehicle systems.

10. The method of claim 9, wherein the particle detector sensor comprises an optical particle sensor.

11. The method of claim 9, wherein the method further comprises:

transmitting the visibility value to a ground station.

12. The method of claim 9, wherein the vehicle comprises an aircraft, a ground vehicle, or a marine craft.

13. A system for estimating flight visibility, the system comprising:

a particle detector sensor mounted on an aircraft; and a processor in operative communication with the particle detector sensor, wherein the processor is operative to execute instructions to perform a method comprising:

analyzing data received from the particle detector sensor to determine particle distribution in a unit volume of air outside the aircraft;

performing particle differentiation by binning particle sizes and particle types per the unit volume of air, the particle types including spherical particles, or both spherical particles and aspherical particles;

determining an extinction coefficient for the spherical particles, or extinction coefficients for the spherical particles and the aspherical particles;

calculating a flight visibility value for the aircraft based on a sum of the extinction coefficients; and outputting the flight visibility value to one or more onboard aircraft systems.

14. The system of claim 13, wherein the particle detector sensor comprises a laser-based optical particle sensor.

15. The system of claim 13, wherein the flight visibility value is calculated using an equation based on Koschmieder's equation.

16. The system of claim 13, wherein the one or more onboard aircraft systems comprise a flight crew display, a flight management system, or a flight data recorder.

17. The system of claim 13, wherein the one or more onboard aircraft systems comprise:

an onboard data server for transmission of the flight visibility value to ground based services or consumers; or an air to air datalink for transmission of the flight visibility value to other aircraft consumers.

18. The system of claim 13, wherein the processor is operative to output the flight visibility value in a selective output format comprising statute miles, kilometers, nautical miles, or feet.

19. The system of claim 13, wherein the processor is operative to:

generate an alert or notification when the flight visibility value is below a minimum visibility required for a selected instrument approach procedure;

generate an alert or notification when the flight visibility value is below a minimum visibility required for visual flight rules; or generate an alert or notification when the flight visibility value is below, above, or deviates from a preselected range.

20. The system of claim 13, wherein the processor is operative to output the flight visibility value on demand, or at selected time intervals.

* * * * *